(12) United States Patent
Chatterjee et al.

(10) Patent No.: US 7,747,835 B1
(45) Date of Patent: Jun. 29, 2010

(54) METHOD, SYSTEM, AND APPARATUS FOR EXPANDING STORAGE CAPACITY IN A DATA STORAGE SYSTEM

(75) Inventors: Paresh Chatterjee, Fremont, CA (US); Venkatesh Ramamurthy, Lilburn, GA (US); Suresh Grandhi, Fremont, CA (US); Loganathan Ranganathan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 998 days.

(21) Appl. No.: 11/417,801

(22) Filed: May 4, 2006

Related U.S. Application Data

(60) Provisional application No. 60/689,304, filed on Jun. 10, 2005.

(51) Int. Cl.
*G06F 12/00* (2006.01)
*G06F 13/00* (2006.01)
(52) U.S. Cl. .................. 711/170; 711/100; 711/114; 711/154
(58) Field of Classification Search ................ 711/100, 711/111, 151, 170, 171, 172
See application file for complete search history.

(56) References Cited

U.S. PATENT DOCUMENTS

| 4,942,579 | A | 7/1990 | Goodlander et al. |
|---|---|---|---|
| 5,257,367 | A | 10/1993 | Goodlander et al. |
| 5,720,027 | A | 2/1998 | Sarkozy et al. |
| 5,732,238 | A | 3/1998 | Sarkozy |
| 5,787,459 | A * | 7/1998 | Stallmo et al. .............. 711/112 |
| 5,790,774 | A | 8/1998 | Sarkozy |
| 5,893,919 | A | 4/1999 | Sarkozy et al. |
| 6,098,128 | A | 8/2000 | Velez-McCaskey et al. |
| 6,327,638 | B1 * | 12/2001 | Kirby ............................ 711/4 |
| 6,484,235 | B1 * | 11/2002 | Horst et al. ................. 711/114 |
| 6,718,436 | B2 * | 4/2004 | Kim et al. ................... 711/114 |
| 6,901,479 | B2 * | 5/2005 | Tomita ....................... 711/114 |

* cited by examiner

*Primary Examiner*—Tuan V. Thai
(74) *Attorney, Agent, or Firm*—Hope Baldauff Hartman LLC

(57) ABSTRACT

A method, system, and apparatus for expanding the storage capacity of a data storage system are provided. According to one method, the physical storage devices that store the data and metadata for one or more logical disks are organized into a container. A logical disk segment is created within the container for each logical disk. When storage capacity is added through the addition of logical disks, a new logical disk segment is added to the end of the container for the new logical disk. When storage capacity is added through the addition of capacity to an existing logical disk, a new logical disk segment is added to the end of the container for the new logical disk segment within the logical disk. The devices within a container may be migrated between server computers or between CPUs with their associated mass storage controllers.

18 Claims, 10 Drawing Sheets

METHOD, SYSTEM, AND APPARATUS FOR EXPANDING STORAGE CAPACITY IN A DATA STORAGE SYSTEM

CROSS-REFERENCE TO RELATED APPLICATIONS

This application claims the benefit of U.S. provisional patent application No. 60/689,304, filed on Jun. 10, 2005, and which is expressly incorporated herein by reference in its entirety.

TECHNICAL FIELD

The present invention is related to the field of computer data storage. More particularly, the present invention is related to the field of capacity expansion in data storage systems.

BACKGROUND OF THE INVENTION

However large and sufficient a data storage system may initially appear, the experience of the data storage industry has shown that all storage systems require support for capacity expansion. Capacity expansion refers to the process of adding additional data storage space to a data storage system. There are two primary ways in which the capacity of a data storage system may be expanded. The first way that capacity may be expanded is through the addition of mass storage devices, such as hard disk drives, to a data storage system. This type of capacity expansion is known as 'vertical' expansion. The second way that capacity may be expanded is through the addition of storage nodes. This is referred to as 'horizontal' expansion.

Another way that capacity may be added to a particular storage node is through the process of drive group migration. Drive group migration involves physically moving a group of mass storage devices from one storage node to another. When this process is performed, it is expected that the data, volumes and storage metadata on the group of drives that is being moved will remain intact. However, organizing the mass storage devices and the data stored thereon to enable both capacity expansion and drive group migration, while also retaining high-performance and conventional access to the data, can be a challenging undertaking.

In some data storage systems, it is necessary to configure the storage nodes so that data access is not interrupted in the presence of CPU, memory, motherboard or disk controller failure. In order to provide this functionality, redundant active-active controller pairs are frequently utilized. Active-active controller pairs allow one controller and its associated components to take over the volumes of another controller in the event of a failure. Rather than one controller being unutilized and simply acting as a backup for the other controller, both controllers are actively utilized during normal operation, and each controller can provide backup to the other controller in the event of a failure. It has proven to be difficult to implement a storage system utilizing active-active controllers and that also meets the desirable goals of simple capacity expansion and functional drive group migration.

It is with respect to these considerations and others that the present invention has been made.

SUMMARY OF THE INVENTION

In accordance with the present invention, the above and other problems are solved by a method, system, apparatus, and computer-readable medium for expanding the data storage capacity of a computer system simply, and in a manner that retains the ability for easy drive group migration. The embodiments of the invention also provide this functionality while also enabling the use of active-active controller pairs.

According to one method provided by an embodiment of the invention, one or more logical disks are provided for storing data. The logical disks may be comprised of one or more physical storage devices, such as hard disk drives or redundant arrays of disks. The physical storage devices that store all of the data and metadata for a logical disk are organized into a container. Each logical disk is represented within the container by a logical disk segment. A logical disk segment is a continuous region of a logical disk that is exposed to the container. Accordingly, a container is a self-contained group of contiguous logical disk segments. A container has a beginning and an end, and each new logical disk segment is added to the end of the container in one embodiment.

According to other aspects of the method, one or more physical storage devices may be added in order to expand the capacity of a storage system. When physical storage devices are added, a new logical disk drive may be created that utilize the newly added storage devices. A new logical disk segment is also added to the container that corresponds to the new logical disk drive. Alternately, one or more physical storage devices may be added to the storage system and utilized with an existing logical disk drive to expand the capacity of the logical disk drive. In this case, a new logical disk segment is added to the end of the container corresponding to the added physical storage device. In order to add a logical disk to a container, metadata may be written to the logical disk identifying the logical disk as belonging to the container.

A result of organizing logical disks into containers in the manner described herein is that drive groups may be easily migrated from one storage node to another. In particular, all of the data and metadata for one or more logical disk drives may be migrated between storage nodes by migrating all of the devices referenced within a container. Moreover, the use of containers in the manner described herein simplifies the utilization of active-active controllers. In particular, because each volume is wholly contained within a container, one CPU (and its associated set of peripheral controllers) in an active-active controller pair may be utilized to operate on a subset of the plurality of containers in the system. A second CPU (and its associated set of peripheral controllers) may operate on a complementary subset of containers. If the first controller group fails, then the other active controller group takes control of the containers. For example, according to an embodiment, each controller may be assigned one half of the containers in the computer system. If one controller fails, the remaining controller takes control of all of the containers.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
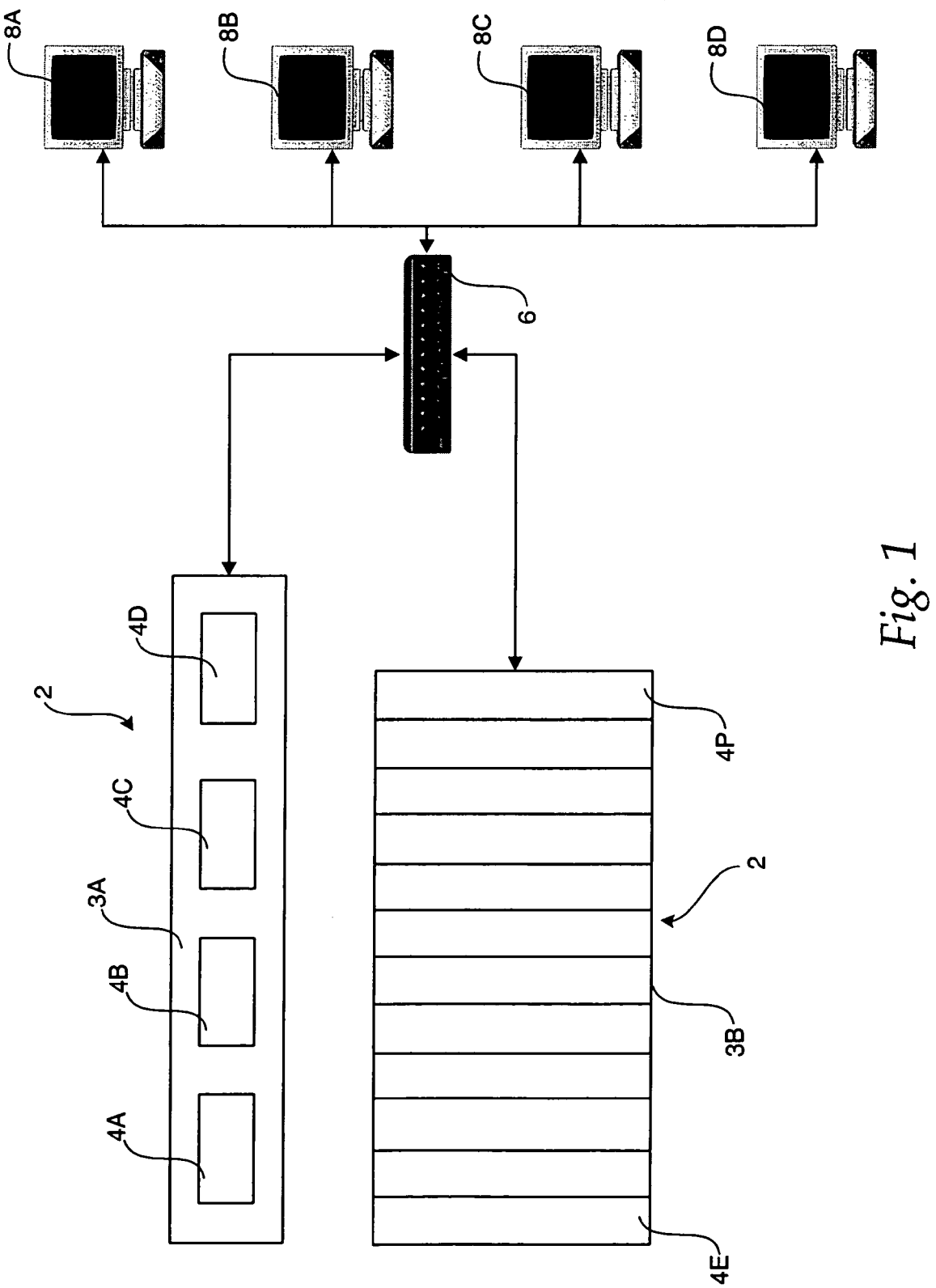
FIG. 1 is a computer architecture diagram showing aspects of a computer network utilized as an illustrative operating environment for the various embodiments of the invention.

Embodiments of the present invention provide a method, system, apparatus, and computer-readable medium for expanding the storage capacity of a computer system in a manner that permits drive migration and the use of active-active mass storage controllers. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
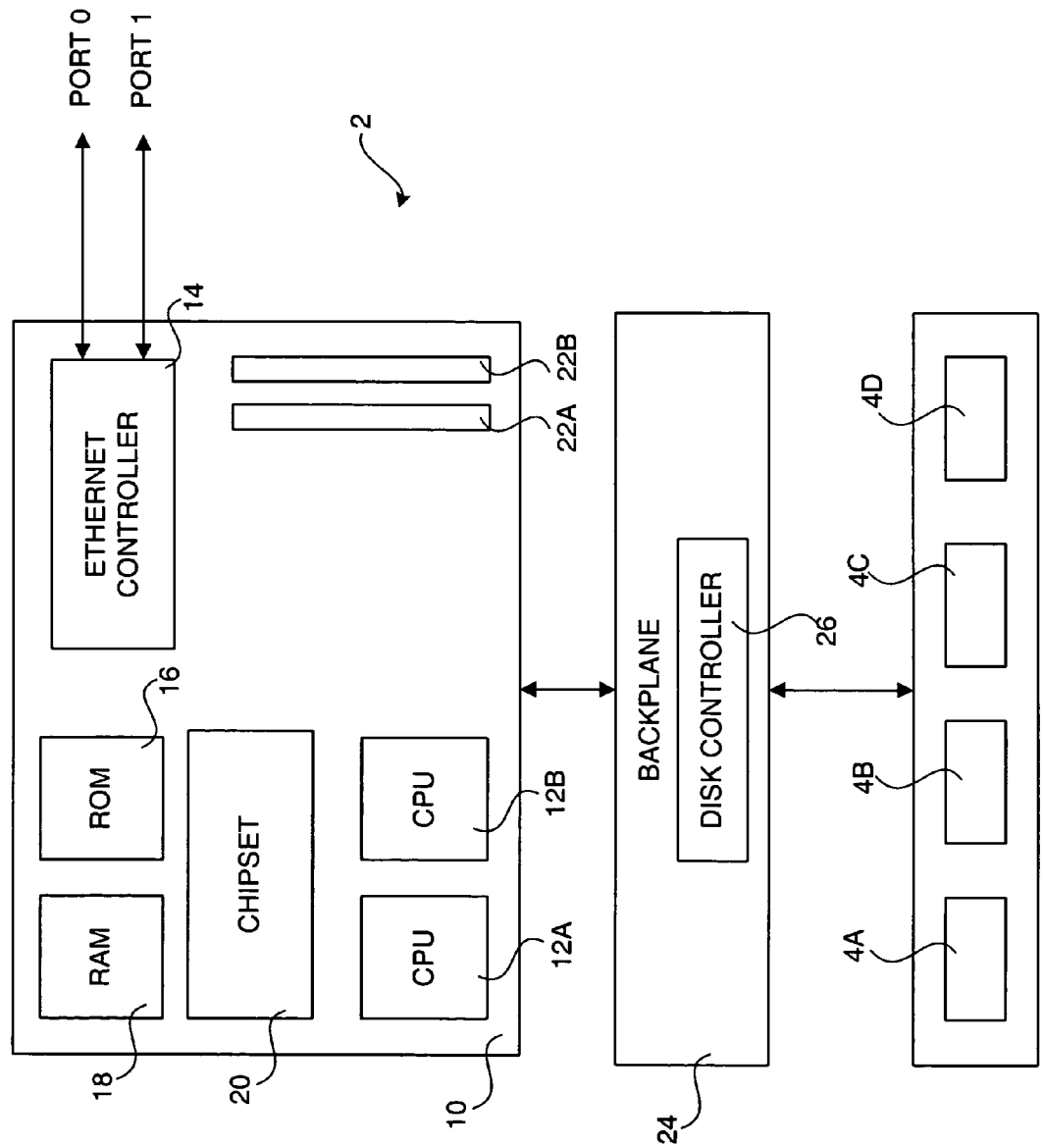
FIG. 2 is a computer architecture and network diagram illustrating aspects of a storage server computer provided by the various embodiments of the invention.
Figure 3:
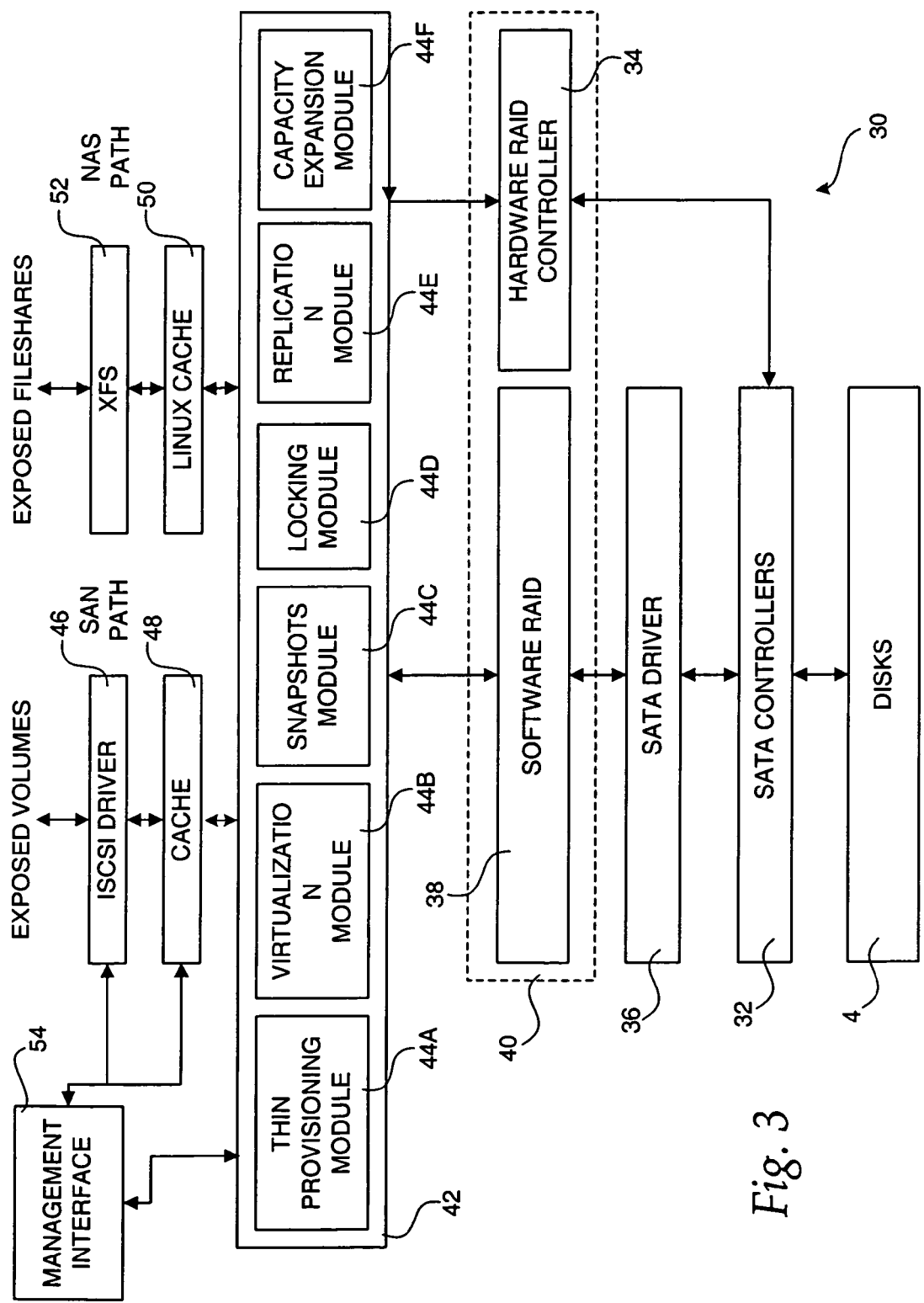
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage device, such as a hard disk drive. According to embodiments of the invention, the storage server computer 2 may be housed in a one rack space unit 3A storing up to four hard disk drives 4A-4D. Alternatively, the storage server computer may be housed in a three rack space unit 3B storing up to twelve hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 3 or may be connected to the storage server computer 2 via a distributed wide area network, such as the Internet. An appropriate protocol, such as the Internet Small Computer Systems Interface ("iSCSI") protocol may be utilized to enable the initiators 8A-8D to communicate with and utilize the various functions of the storage server computer 2 over a wide area network such as the Internet.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into volumes for access by the initiators 8A-8D. Additional advanced features described herein may also be provided by the storage server computer 2.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller and network interface controllers may also be embedded on the motherboard 10 or implemented in software by the storage server computer 2. It is also contemplated that the storage server computer 2 may include other components that are not explicitly shown in FIG. 2 or may include fewer components than illustrated in FIG. 2.

As described briefly above, the motherboard 2 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and is thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include a RAM 18 and a ROM 16. The ROM 16 may store a basic input/output system or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a device driver 42 that implements the functions described herein. In particular, the device driver 42 may provide functionality for implementing thin provisioning, virtualization, snapshots, locking, replication, and capacity expansion. These features are implemented by the modules 44A-44F, respectively, and are described in greater detail herein. Above the device driver 42, a number of software components are utilized depending upon the access mechanism utilized to access the data stored on the hard disk drives 4. In particular, a Storage Area Network ("SAN") path is provided that utilizes a cache 48 and a Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the device drive 42 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash.

According to embodiments of the invention, a management interface 54 may also be provided for controlling and monitoring the various aspects of the present invention. The management interface communicates with the various layers through software interfaces to retrieve performance data, provide configuration data, and to perform other functions.

Figure 4:
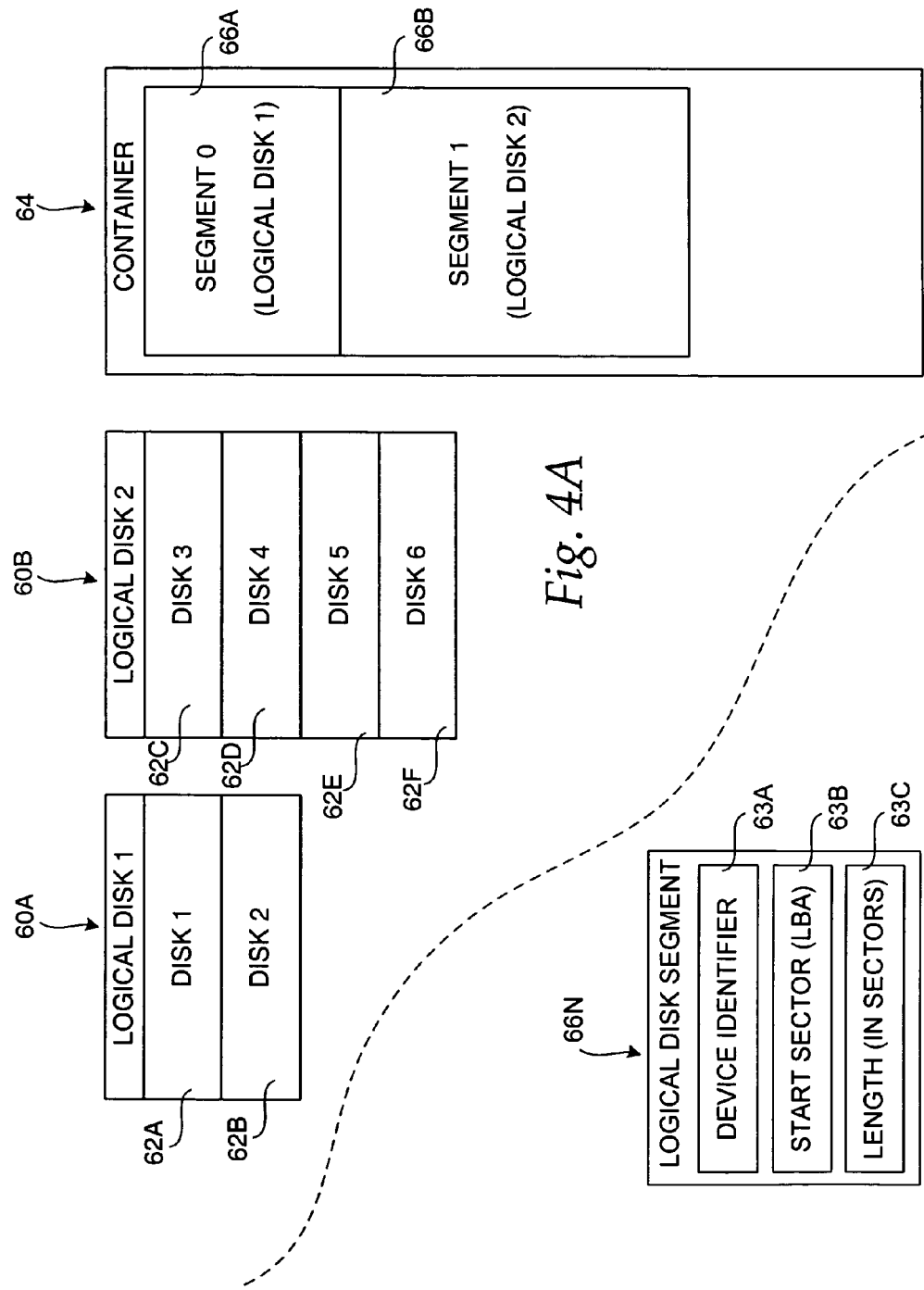
FIGS. 4-6 are block diagrams illustrating the organization of logical disks into containers, the expansion of a container through the addition of a logical disk, and the addition of a hard disk drive to a logical disk, respectively, according to embodiments of the invention.

Referring now to FIG. 4A, additional details regarding the operation of the capacity expansion module 44F will be described. As discussed briefly above, the computer 2 is operative to provide functionality for enabling the expansion of its data storage capacity in a manner that permits easy drive group migration and the utilization of active-active controller pairs. In this regard, the capacity expansion module 44F is operative to organize the physical mass storage devices connected to the computer 2 in a manner that enables this functionality. For instance, FIG. 4A illustrates two logical disk drives configured in the computer 2 and the container 64 utilized to organize the contents of the logical disk drives. In particular, the logical disk drive 60A has been configured within the computer 2 and consists of the storage provided by the physical disk drives 62A and 62B. Similarly, the logical disk drive 60B utilizes the storage capacity provided by the physical disk drives 62C-62F.

In order to organize the storage space utilized by the logical disk drives 60A and 60B, the capacity expansion module 44F organizes the physical storage devices that store all of the data and metadata for one or more logical disks into a container. Each logical disk is represented within the container by a logical disk segment. A logical disk segment is a continuous region of a logical disk that is exposed to the container. As shown in FIG. 4B, the properties that define a logical disk segment 66N are: a device identifier 63A (such as a logical drive name or unique identifier); a start logical block address 63B; and length 63C. Accordingly, a container is a self-contained group of contiguous logical disk segments. According to embodiments, the first logical disk segment in a container is referred to as the master logical disk. The master logical disk may contain all of the volume tables and metadata for the container, or the volume tables and metadata may be distributed across the various logical disks that constitute the container.

According to embodiments of the invention, a container has a beginning and an end, and each new logical disk segment is added to the end of the container. For instance, utilizing the example in FIG. 4A, the container 64 is maintained that includes a logical disk segment 66A corresponding to the logical disk 60A. The container 64 also includes a logical disk segment 66B that corresponds to the logical disk 60B. It should be appreciated that the container includes an address space formed by concatenating or striping the address space of each logical disk referenced by the container. It should also be appreciated that a container represents a group of physical mass storage devices that together represent the complete set of data and metadata for all of the logical storage volumes present in the group. As will be described in greater detail below, it is this feature of the container that enables easy drive group migration, capacity expansion, and the use of active-active controller pairs.

Figure 5:
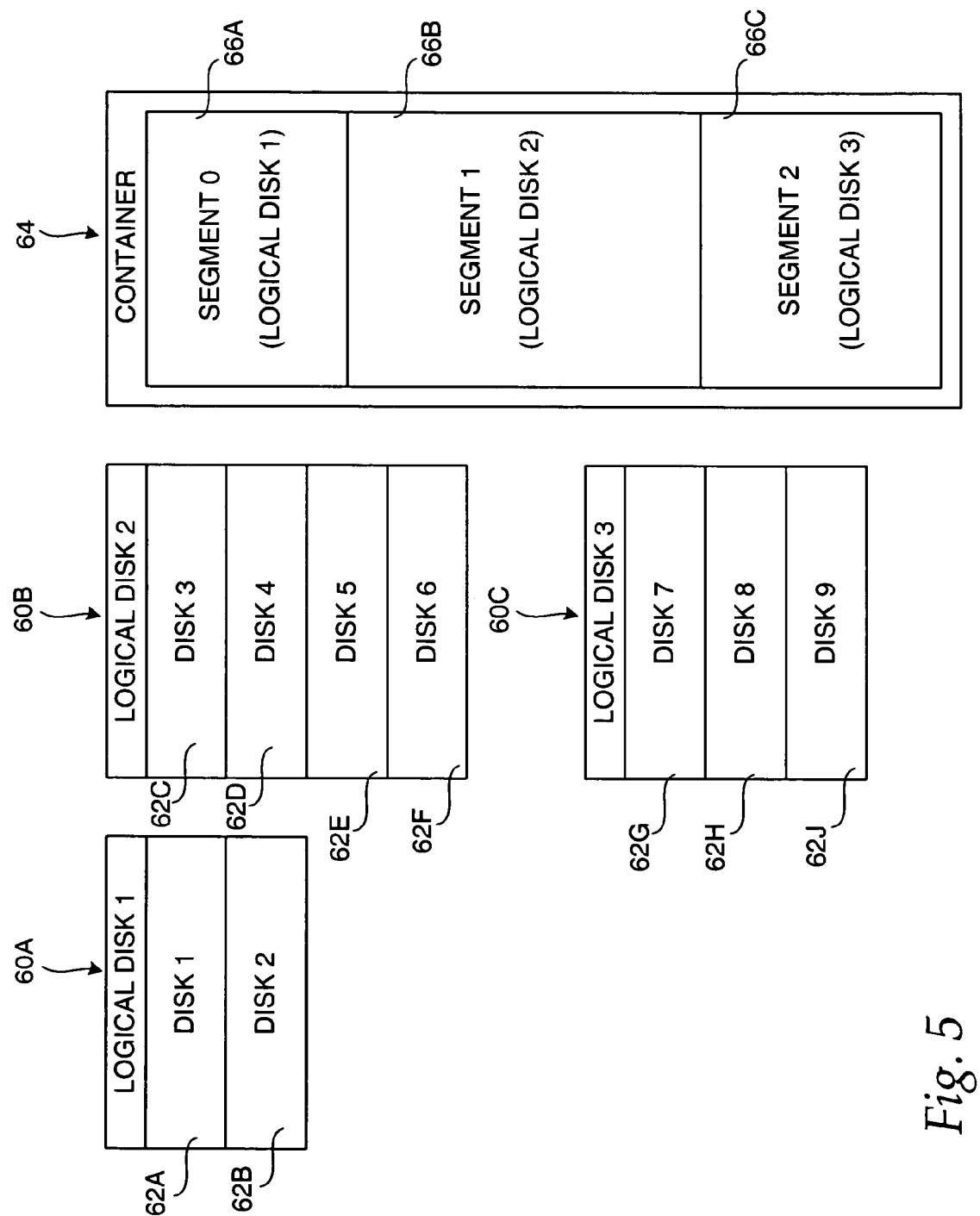

Turning now to FIG. 5, additional details regarding the aspects of the invention for expanding the capacity of a computer system through the addition of a logical disk drive will be provided. In particular, as shown in FIG. 5, a logical disk 60C has been added to the computer 2 through the addition of the physical disk drives 62G-62J. In order to expand the container 64 to account for the newly added logical disk 60C, a new logical disk segment 66C is added to the end of the container 64. If the container has been configured to concatenate logical disk segments, the new logical disk segments are added to the end of the container 64, and they do not disturb the existing data configuration of the container 64. Therefore, the only action that needs to be performed for the addition of a logical disk to a container is to write metadata on the logical disk identifying it as a part of the container. Accordingly, metadata may be written to the logical disk 60C to indicate that it is part of the container 64. Alternatively, the container 64 may be configured to have striped logical disk segments, in which case, for maximum performance, a transformation may be performed to re-stripe data across the new set of logical drives. In this case also, metadata is written to the logical disk 60C to indicate it is part of the container. In order to protect this metadata, it may be written to more than one logical disk on the container also.

Figure 6:
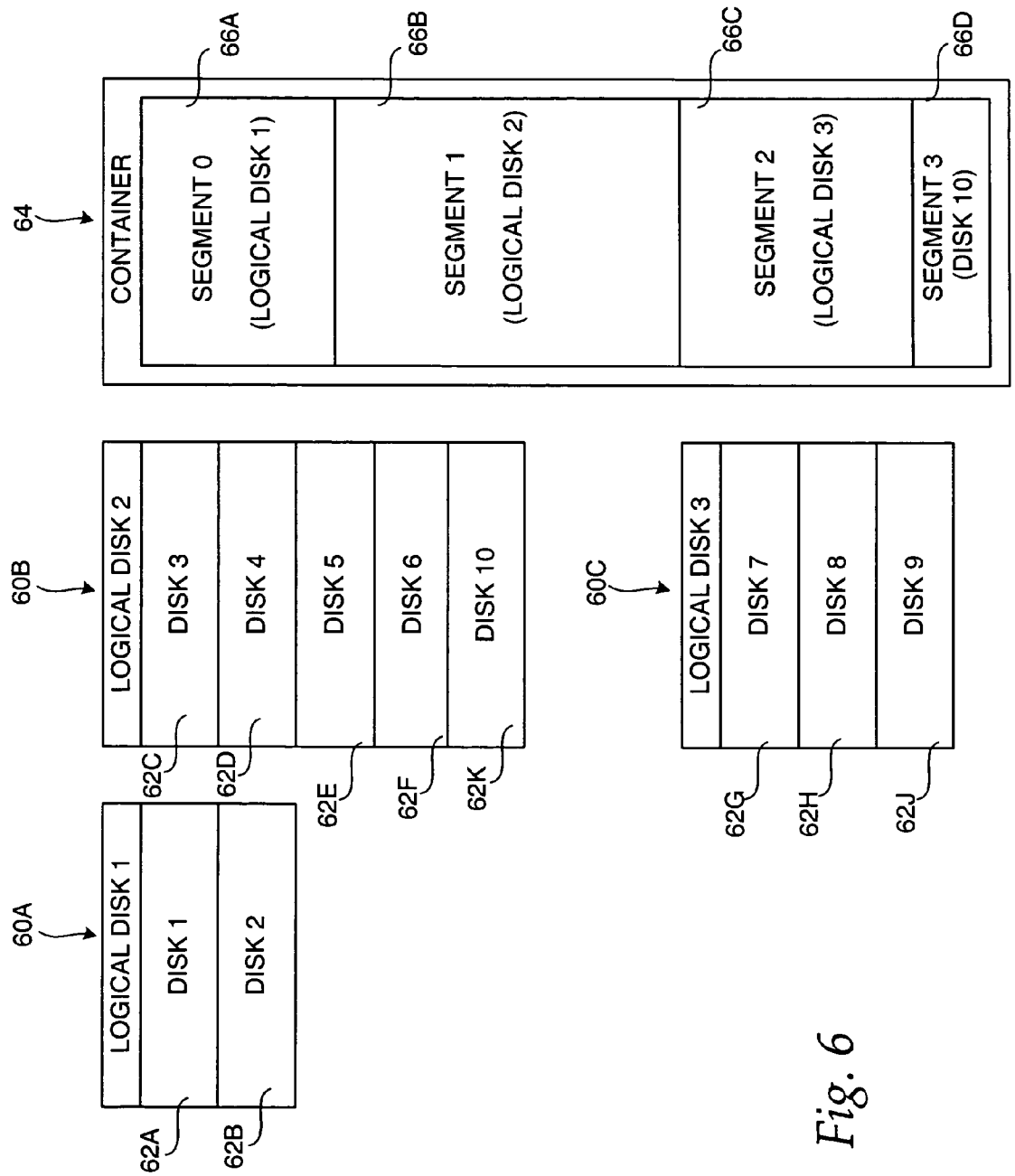

Referring now to FIG. 6, additional details regarding the aspects of the invention for expanding the capacity of a computer system through the addition of capacity to an existing logical disk drive will be provided. In particular, FIG. 6 shows the addition of physical capacity to the logical disk drive 60B through the addition of the physical disk drive 62K. If the logical disk segment corresponding to the newly added drive 62K were added to the end of the logical disk segment 66B in the container 64, severe problems would be created because the positions of the data and metadata following the segment 66B would no longer be valid. In order to solve this problem, a new logical disk segment 66D is added to the end of the container 66D that corresponds to the newly added disk 62K. This innovation does not cause the performance of the container to decrease during either sequential or random I/O loads, because within each logical drive, data is inherently arranged in a way that maximizes performance, in patterns such as RAID-0 or RAID-5.

As another illustrative example, if a logical disk of size 1 terabytes ("TB") expands to a size of 1.5TB through the expansion of the underlying RAID device, then the logical disk now has two segments: a segment of size 1TB and a second segment of size 0.5TB. Each of these segments is then presented to the container as though they were two separate logical disks. Accordingly, a container can be though of as a self-contained group of continuous logical disk segments.

Figure 7:
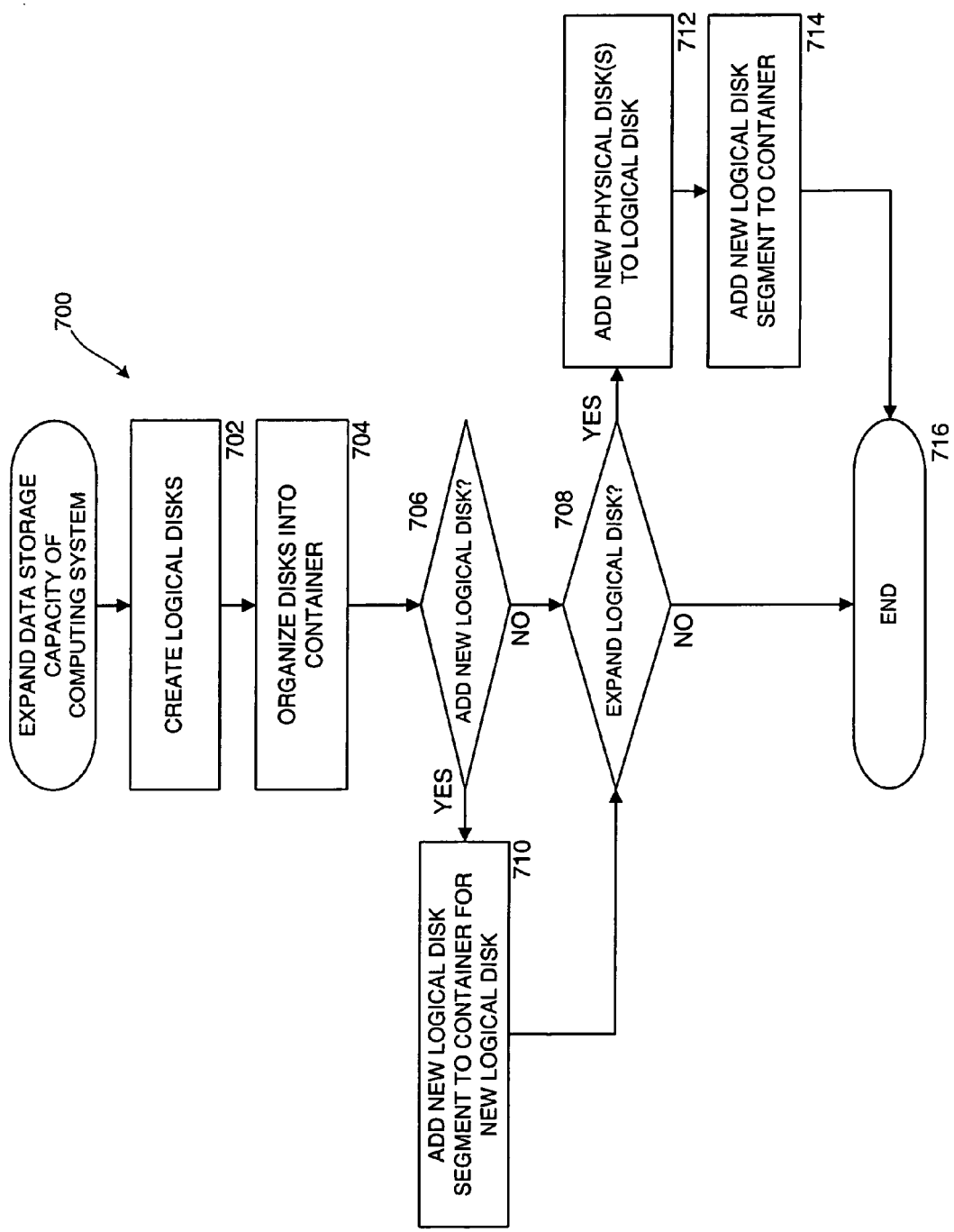
FIG. 7 is a flow diagram illustrating a process provided by one embodiment of the invention for expanding the data storage capacity of a computer system.

Referring now to FIG. 7, additional details regarding the operation of the computer 2 for providing functionality for data storage capacity expansion will be provided. In particular, a routine 700 will be described illustrating operations performed by the computer 2 for enabling the expansion of its data storage capacity through the addition of logical storage volumes or through the addition of capacity to an existing logical volume.

It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 7 and 9 making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 700 begins at operation 702, where logical disk drives are created within the computer 2. The method 700 then continues to operation 704, where the logical disk drives are organized into a container in the manner described above. In particular, logical disk segments corresponding to the logical disk drives are concatenated in the container to form the address space of the container. The first logical disk segment is the master logical disk segment and includes the volume table and other configuration information. From operation 704, the routine 700 continues to operation 706.

At operation 706, a determination is made as to whether the data storage capacity of the computer 2 has been expanded through the addition of a new logical disk. If so, the routine 700 branches to operation 710, where a new logical disk segment for the newly added logical disk is added to the end of the container. The routine then continues from operation 710 to operation 708. If, at operation 706, it is determined that capacity has not been added to the computer 2 through the addition of a new logical disk, the routine 700 continues from operation 706 to operation 708.

At operation 708, a determination is made as to whether the capacity of the computer 2 has been expanded through the addition of capacity to an existing logical disk drive. If so, the routine 700 branches to operation 712, where the new capacity is added to the existing logical disk drive. The routine 700 then continues to operation 714, where a new logical disk segment is added to the end of the container corresponding to the newly added capacity. The routine 700 then continues from operation 716, where it ends.

Figure 8:
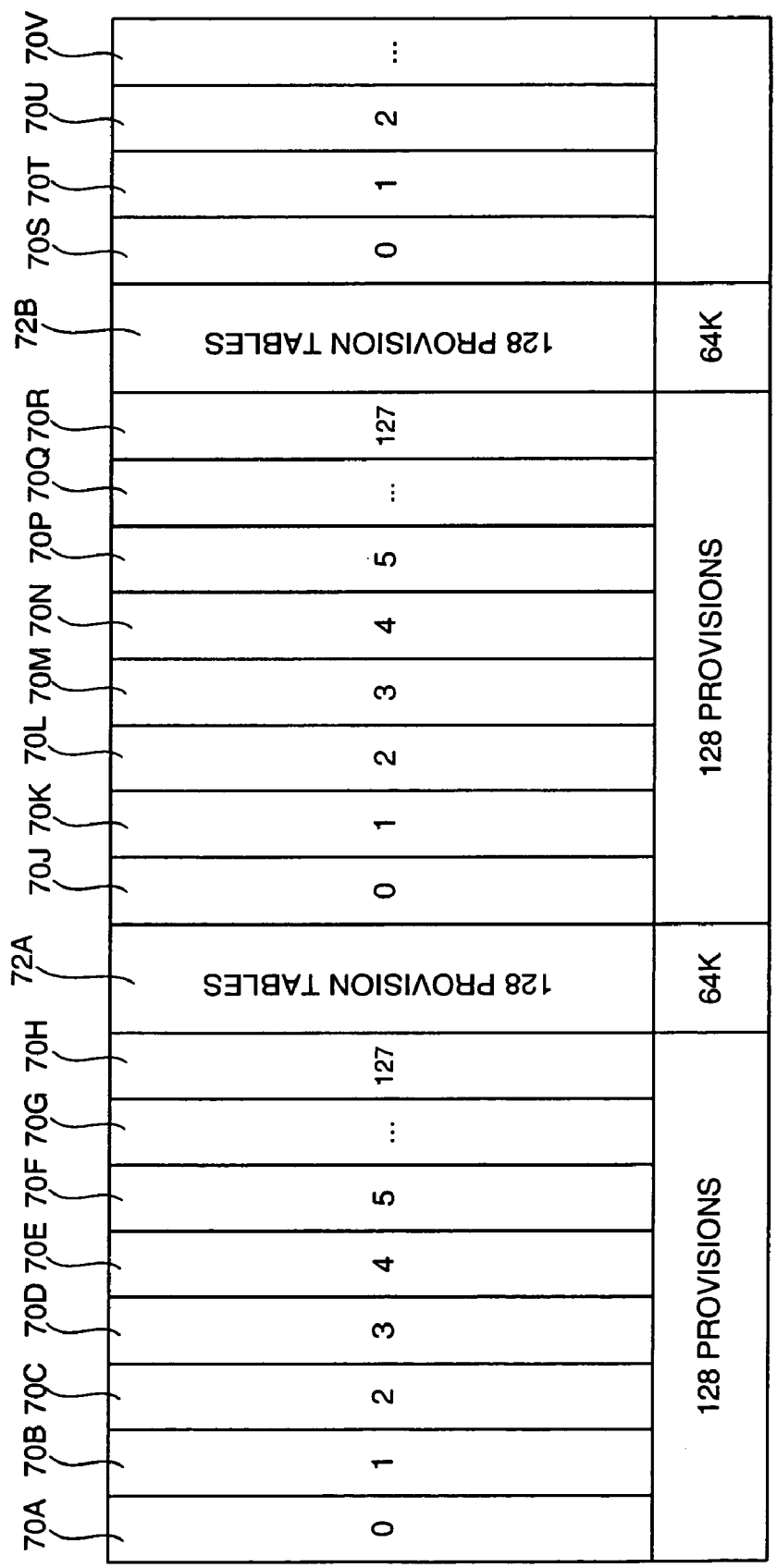
FIG. 8 is a block diagram illustrating aspects of the invention for storing metadata among various logical disks utilized in the embodiments of the invention.

Referring now to FIG. 8, additional details regarding the aspects of the invention for storing metadata among various logical disks utilized in the embodiments of the invention will be described. Often, storage systems utilize metadata that is stored in particular regions of the disks. This metadata may also be distributed with the data. In a thin provisioned system, where storage is allocated on demand, this metadata may be, for instance, one sector for each unit of allocation (referred to herein as a "provision"). However, the metadata is not distributed among the data with a granularity of one entry per provision. This is not done because there are situations where the presence of metadata in a certain region of data may cause a provision to be split between two redundant array of inexpensive disk ("RAID") stripes, thereby causing inefficiency in access. Hence, as much metadata as will fit into one RAID stripe are grouped and written to disk together after the data. FIG. 8 illustrates this process.

Metadata may also be written to the disks in an entirely different manner, such as by logging metadata changes to a log partition, or by writing the totality of metadata to the disks during each metadata change, or persisting metadata on fast, non-volatile memory.

Figure 9:
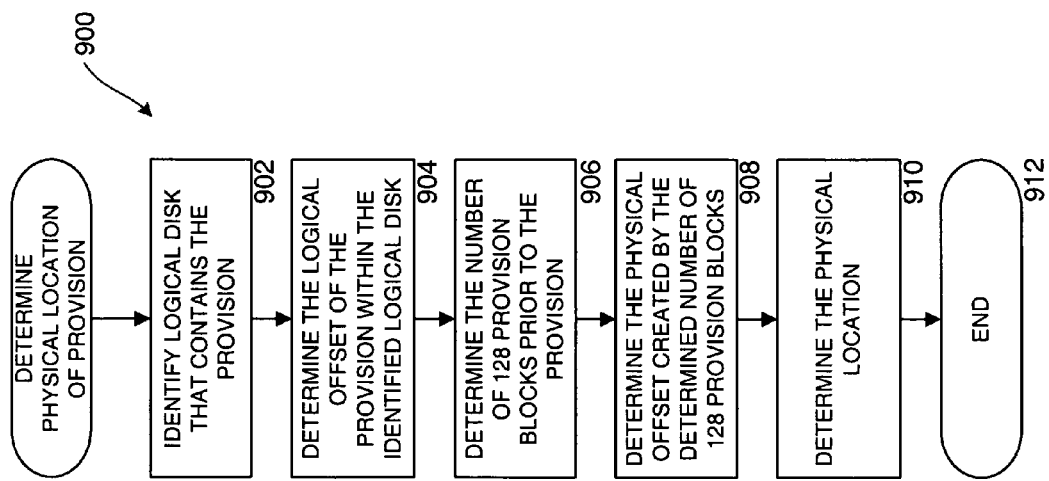
FIG. 9 is a flow diagram illustrating a process provided in one embodiment of the invention for determining the physical location of a provision.

As shown in FIG. 8, an illustrative provision size is one megabyte ("MB") and an illustrative RAID stripe size is 64 kilobytes ("kB") (128 sectors). In this case, 128 provisions 70A-70H are written to disk. Following those provisions, 128 provision tables containing the metadata are grouped and written to disk as the 64 kB portion 72A. This process is repeated for the provisions 70J-70R and the 64 kB portion 72B, etc. However, because the RAID stripe size may be different for each logical disk in a container, processing must be performed to locate the physical location of any provision within a container. FIG. 9 is a flow diagram showing an illustrative routine for performing this processing and is described in detail below.

Turning now to FIG. 9, additional details regarding an illustrative routine 900 provided in one embodiment of the invention for determining the physical location of a provision will be provided. The routine 900 begins at operation 902, where the logical disk that contains the desired provision is determined by comparing it against cumulated data lengths. The routine 900 then continues to operation 904, where the offset of the provision within the identified logical disk drive is determined. From operation 904, the routine 900 continues to operation 906, where the number of 128-provision blocks are present prior to the desired provision by dividing the logical block address ("LBA") of the desired provision by 128 times the provision size in sectors. This arrangement maximizes performance when the RAID stripe size is 64 kilobytes and the provision table size is 1 sector, because in such an arrangement, a set of 128 1-sector provision tables will constitute a maximal single-disk write I/O of size 64 kilobytes. In systems that have a different RAID stripe size, or a different provision table size, a different factor may be used instead of 128.

From operation 906, the routine 900 continues to operation 908, where the physical offset caused by the determined number of 128-provision blocks is calculated. This is calculated by multiplying the determined number of 128-provision blocks by one plus the provision size in sectors. The routine 900 then continues to operation 910, where the physical location of the desired provision is determined by adding the remainder of the LBA when divided by the result of multiplying 128 by the provision size in sectors. The routine 900 then continues to operation 912, where it ends.

Figure 10:
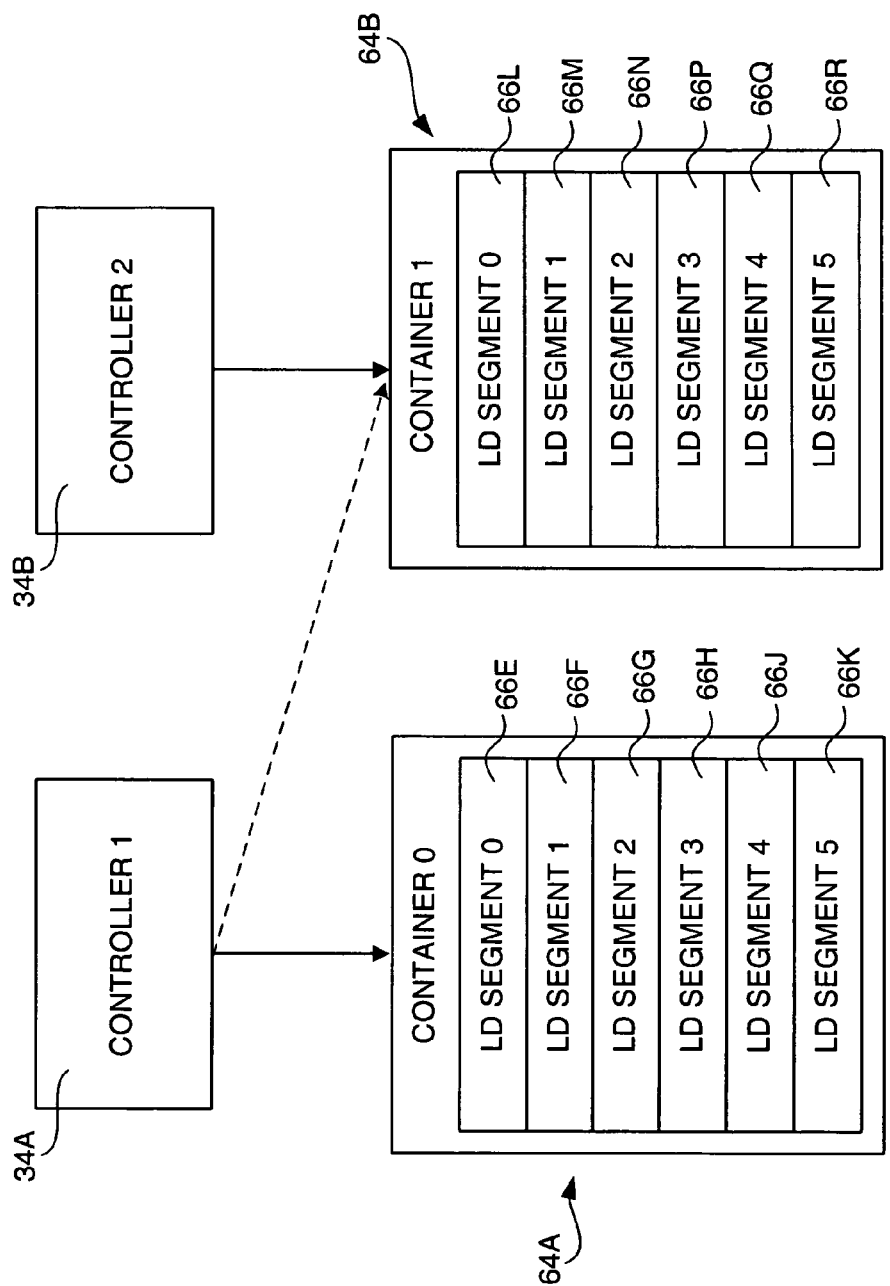
FIG. 10 is a block diagram illustrating aspects of the invention for utilizing active-active controllers with a container provided in one embodiment of the invention.

Referring now to FIG. 10, additional details regarding the aspects of the invention for utilizing active-active controllers with a container will be described. Because each volume is wholly contained within a container, and because multiple containers may be utilized within the computer 2, it is possible to have several distinct containers that can be operated upon without fear of data corruption. In particular, according two embodiments of the invention, two mass storage controllers 34A and 34B may be present within the computer 2. Additionally, two or more containers 64A and 64B may be defined within the computer 2. As shown in FIG. 10, the container 64A is made up of the logical disk segments 66E-66K, while the container 64B is made up of the logical disk segments 66L-66R.

During normal operation, the controller 34A is utilized to enable access to the container 64A and the controller 34B is utilized to enable access to the container 64B. In the event of the failure of the controller 34B, however, the controller 34A is operative to take over the responsibility for providing access to the container 64B. Similarly, if the controller 34A were to fail, the controller 34B would provide access to the container 64A. In this manner, active-active controllers may be utilized to provide redundant access to two or more containers in the computer 2. According to embodiments, one half of the containers in the computer 2 may be assigned to the controller 34A while the remaining containers are assigned to the controller 34B.

It will be appreciated that embodiments of the present invention provide a method, system, apparatus, and computer-readable medium for expanding the storage capacity of a computer system. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for expanding a data storage capacity of a computer system, the method comprising:
    providing one or more logical disks for storing data, each of the logical disks utilizing one or more physical storage devices;
    organizing the one or more physical storage devices that store all of the data and metadata for the one or more logical disks into a container, wherein each of the one or more logical disks is represented within the container by one or more logical disk segments, each logical disk segment comprising a continuous region of storage in the logical disk; and
    expanding the data storage capacity of the computer system by adding a new logical disk to the computer system through the addition of a new logical disk segment to the container corresponding to the new logical disk.

2. The method of claim 1, further comprising expanding the data storage capacity of the computer system by increasing the capacity of the container through the addition of a new logical disk segment representing a new continuous region of storage in a logical disk corresponding to one or more added physical storage devices.

3. The method of claim 1, wherein the container comprises a self-contained group of contiguous logical disk segments.

4. The method of claim 3, wherein the container has a beginning and an end, and wherein the new logical disk segment is added to the end of the container.

5. The method of claim 1, further comprising migrating the physical storage devices within the container from a first CPU and its associated set of mass storage controllers to a second CPU and its associated set of mass storage controllers.

6. The method of claim 1, wherein adding a logical disk to a container comprises writing metadata on the new logical disk and zero or more old logical disks identifying the new logical disk as belonging to the container.

7. The method of claim 1, further comprising concatenating or striping an address space of each logical disk to form an address space of the container.

8. A computer-readable storage medium having computer-executable instructions stored thereon that, when executed by a storage system computer, cause the computer to:
    organize a storage space from one or more physical storage devices into a container;
    provide one or more logical disks for storing data, wherein each of the one or more logical disks is represented within the container by one or more logical disk segments, each logical disk segment comprising a continuous region of storage from the storage space of the container; and
    expand a storage capacity of the storage system computer by adding a new logical disk through the addition of a new logical disk segment to the container corresponding to the new logical disk.

9. The computer-readable storage medium of claim 8, having further computer-executable instructions stored thereon that, when executed by the storage system computer, cause the computer to expand the storage capacity of the storage system computer by increasing the capacity of the container through the addition of a new logical disk segment representing a new continuous region of storage space in a logical disk corresponding to one or more added physical storage devices.

10. The computer-readable storage medium of claim 8, wherein the container comprises a self-contained group of contiguous logical disk segments.

11. The computer-readable storage medium of claim 8, having further computer-executable instructions stored thereon that, when executed by the storage system computer, cause the computer to migrate the physical storage devices organized into the container from a first CPU and its associated set of mass storage controllers to a second CPU and its associated set of mass storage controllers.

12. The computer-readable storage medium of claim 8, wherein adding a logical disk to the container comprises writing metadata on the new logical disk and zero or more old logical disks identifying the new logical disk as belonging to the container.

13. The computer-readable storage medium of claim 8, having further computer-executable instructions stored thereon that, when executed by the storage system computer, cause the computer to concatenate or stripe an address space of each logical disk to form an address space of the container.

14. A system for expanding a data storage capacity of a storage system computer, the system comprising:
    one or more physical storage devices; and
    a storage system computer operatively connected to the one or more physical storage devices and programmed to perform the operations of
        organizing the storage space from the one or more physical storage devices into a container,
        providing one or more logical disks for storing data, wherein each of the one or more logical disks is represented within the container by one or more logical disk segments, each logical disk segment comprising a continuous region of storage from the storage space of the container, and
        expanding the data storage capacity of the storage system computer by adding a new logical disk through the addition of a new logical disk segment to the container corresponding to the new logical disk.

15. The system of claim 14, wherein the storage system computer is further programmed to expand the storage capacity of the storage system computer by increasing the capacity of the container through the addition of a new logical disk segment representing a new continuous region of storage space in a logical disk corresponding to one or more added physical storage devices.

16. The system of claim 14, wherein the storage system computer is further programmed to migrate the physical storage devices organized into the container from a first CPU and its associated set of mass storage controllers to a second CPU and its associated set of mass storage controllers.

17. The system of claim 14, wherein adding a logical disk to the container comprises writing metadata on the new logical disk and zero or more old logical disks identifying the new logical disk as belonging to the container.

18. The system of claim 14, wherein the storage system computer is further programmed to concatenate or stripe an address space of each logical disk to form an address space of the container.

* * * * *